Patented Aug. 8, 1950

2,517,935

UNITED STATES PATENT OFFICE 2,517,935

DYESTUFFS OF THE ANTHRAQUINONE SERIES

Frank Hayhurst Slinger, Blackley, Manchester, and William Wyndham Tatum, Trevone, near Padstow, Cornwall, England, assignors to Imperial Chemical Industries Limited, a corporation of Great Britain No Drawing. Application November 18, 1947, Serial No. 786,793. In Great Britain November 22, 1946

6 Claims. (Cl. 260—380)

This invention relates to new dyestuffs of the anthraquinone series and more particularly to a process for the manufacture of new dyestuffs of the anthraquinone series suitable for the dyeing of wool.

In British Specification No. 26,944 of 1911 there is described a process for producing wool dyestuffs by reacting phenols, either as alkaline salts or in the presence of alkaline agents, on derivatives of alpha-amino-anthraquinones, containing negative substitutents such as halogen atoms or nitro groups in the beta-position and which contain in the para-position to the amino group auxochromic groups, such as amino, alkylamino, arylamino, or hydroxy groups and by sulphonating if necessary the products thus obtained. As an example of such an alpha-amino-anthraquinone there is mentioned 1:4-diamino-2:3-dichloroanthraquinone which when condensed with one or two molecular proportions of phenol, gives products, which on sulphonation, yield red violet dyestuffs.

We have now found that wool dyestuffs of exceptionally valuable properties are obtained when 1:4-diamino-2:3-dichloroanthraquinone is condensed with alkali metal phenoxides substituted in the para-position by a phenyl group connected either directly or through an oxygen atom, and the products thus obtained are sulphonated.

According to our invention therefore we provide a process for the manufacture of wool dyestuffs which comprises sulphonating the product obtained by reacting one molecular proportion of 2:3-dichloro-1:4-diamino-anthraquinone with two molecular proportions of an alkali metal phenoxide carrying in the para-position a phenyl group attached either directly or through an oxygen atom.

As suitable alkali metal phenoxides there may be mentioned for example the alkali salts of 4-hydroxydiphenyl, 4-hydroxydiphenylether, and 2-hydroxydiphenylene oxide. (The system for numbering diphenylene oxide used in this specification is that given in "The Ring Index" by Patterson and Capell 1940, published by the Reinhold Publishing Corporation, page 234, No. 1719, that is the oxygen atom is numbered 5). The alkali metal phenoxide may be made for example by adding caustic alkali to the molten phenol or to a solution of the phenol in a suitable solvent such as for example nitrobenzene, and then heating the mixture to remove water.

The reaction between the alkali metal phenoxide and the 2:3-dichloro-1:4-diaminoanthraquinone is conveniently brought about by stirring the reagents together at a suitable temperature if desired in the presence of an excess of alkali metal phenoxide or of the corresponding phenol and if desired in the presence of a suitable solvent such as for example nitrobenzene. The products thus obtained contain two diphenyl or diphenylether residues connected through the oxygen atom of the original phenolic hydroxy groups to the 2- and 3-positions of the anthraquinone nucleus.

The sulphonation of the colour base so obtained may be carried out for example by stirring the colour base with, for example, 98% sulphuric acid at about 20° C. until a test sample of the reaction mixture dissolves completely in dilute caustic soda solution. The dyestuff is conveniently isolated by pouring the sulphonation mixture into water, filtering, dissolving the residue in dilute caustic soda solution, salting out, filtering and drying.

The dyestuff may contain one, two or three sulphonic acid groups per molecule according to the conditions used in the sulphonation process. Mixtures of dyestuffs containing an average of between one and two or between two and three sulphonic acid groups per molecule, which are conveniently obtained in practice, possess all the advantages of the individual dyestuffs.

The dyestuffs obtained by the process of the present invention give violet shades on wool which are particularly fast to light and have washing fastness properties superior to those of any of the dyestuffs mentioned in British Specification No. 26,944 of 1911.

The invention is illustrated but not limited by the following examples in which the parts are by weight.

Example 1

15 parts of 4-hydroxydiphenyl are dissolved in 12 parts of nitrobenzene. The solution is stirred at 185° C. and 5 parts of potassium hydroxide are added, 5 parts of 2:3-dichloro-1:4-diaminoanthraquinone are then added and the mixture is stirred at 185–190° C. for 17 hours. The nitrobenzene is removed by steam distillation, the residual suspension is filtered and the residue on the filter is washed with hot water, dried and crystallised from β-ethoxyethanol to give dark violet crystals of M. P. 236–237° C. 4 parts of the 1:4 - diamino - 2:3 - di(diphenylyl - 4' - oxy) anthraquinone so obtained are dissolved in 50 parts of 98% sulphuric acid and the solution stirred at 20° C. until a test sample dissolves completely in dilute caustic soda solution. The dyestuff is precipitated by pouring the sulphonation mixture on to ice and filtering. The residue is dissolved in dilute caustic soda solution and reprecipitated by addition of salt. The dyestuff is then filtered off and dried. The new dyestuff which is essentially the sodium salt of the monosulphonic acid dyes wool from an ammonium acetate bath in bright reddish violet shades of excellent fastness to wet treatments. The fastness to light is 6 on the Society of Dyers and Colourists Scale.

*Example 2*

2.5 parts of potassium hydroxide are dissolved in 20 parts of molten 4-hydroxydiphenyl ether and the mixture so obtained is heated to 175° C. to remove water formed. 5 parts of 2:3-dichloro-1:4-diaminoanthraquinone are gradually added and the mixture is stirred for 17 hours at 175–180° C. The mixture is then poured into ethanol, and water is added. The 1:4-diamino-2:3-di(p-phenoxyphenoxy)anthraquinone so precipitated is filtered off and recrystallised from β-ethoxyethanol. It forms dark violet crystals of M. P. 192–3° C.

4 parts of the base so obtained is dissolved in 50 parts of 98% sulphuric acid and the solution stirred at room temperature until a test sample dissolves completely in dilute caustic soda solution. The resultant dyestuff is isolated by pouring the sulphonation mixture on to ice and filtering. The residue is dissolved in dilute caustic soda solution and reprecipitated by addition of salt. The dyestuff is then filtered off and dried. It is very similar in shade and fastness properties to the product of Example 1.

*Example 3*

15 parts of 2-hydroxydiphenylene oxide are fused with 2.5 parts of potassium hydroxide at a temperature of 150–170° C. until all the water formed has been evaporated. 5 parts of 2:3-dichloro-1:4-diaminoanthraquinone are added and the mixture is stirred for 17 hours at 180–185° C. and then left to cool. 50 parts of ethanol are then added and the mixture is left to crystallise. The crystals obtained are filtered off and washed with ethanol and water. The product may be purified by dissolving it in benzene containing a little pyridine and passing the solution through a column of alumina and then evaporating the solvent from the solution which passes through the column. Violet crystals are thus obtained, M. P. 244–6° C.

1 part of the base so obtained is dissolved in 10 parts of 100% sulphuric acid and the solution is stirred at 20° C. until a test sample dissolves completely in dilute caustic soda solution. The violet dyestuff is isolated by pouring the sulphonation mixture on to ice and filtering. The residue is dissolved in dilute caustic soda solution and reprecipitated by addition of salt. The dyestuff is then filtered off and dried. The new product is essentially a trisulphonic acid salt but contains some of the disulphonic acid salt. It dyes wool from an ammonium acetate dyebath in bright reddish violet shades of excellent fastness to wet treatments. The light fastness on the Society of Dyers and Colourists scale is over 6.

We claim:

1. A compound of the group consisting of 1:4-diaminoanthraquinone and its sulphonation products, which carries in the 2- and 3-positions of the anthraquinone nucleus the negative substituent of a phenol selected from the group consisting of 4-hydroxydiphenyl, 4-hydroxydiphenyl ether and 2-hydroxydiphenylene oxide.

2. A compound of the group consisting of 1:4-diamino - 2:3 - di(diphenylyl - 4'- oxy) anthraquinone and its sulphonation products.

3. A compound of the group consisting of 1:4-diamino-2:3 -di(p-phenoxyphenoxy) - anthraquinone and its sulphonation products.

4. Process for the manufacture of wool dyestuffs which comprises reacting one molecular proportion of 2:3-dichloro-1:4-diaminoanthraquinone with two molecular proportions of an alkali metal salt of a phenol selected from the group consisting of 4-hydroxydiphenyl, 4-hydroxydiphenyl ether and 2-hydroxydiphenylene oxide, and sulfonating the resultant reaction product by the action of sulfuric acid.

5. Process according to claim 4 wherein the phenol is 4-hydroxydiphenyl.

6. Process according to claim 4 wherein the phenol is 4-hydroxydiphenyl ether.

FRANK HAYHURST SLINGER.
WILLIAM WYNDHAM TATUM.

REFERENCES CITED

The following references are of record in the file of this patent:

UNITED STATES PATENTS

| Number | Name | Date |
|---|---|---|
| 1,652,584 | Schmidt | Dec. 13, 1927 |
| 2,072,259 | Haddock et al. | Mar. 2, 1937 |
| 2,225,061 | Lodge | Dec. 17, 1940 |

FOREIGN PATENTS

| Number | Country | Date |
|---|---|---|
| 26,944 | Great Britain | Sept. 26, 1912 |
| 274,211 | Great Britain | July 19, 1927 |